United States Patent
Arthanat

(10) Patent No.: US 9,477,728 B2
(45) Date of Patent: Oct. 25, 2016

(54) HANDLING OF ERRORS IN DATA TRANSFERRED FROM A SOURCE APPLICATION TO A TARGET APPLICATION OF AN ENTERPRISE RESOURCE PLANNING (ERP) SYSTEM

(71) Applicant: Oracle International Corporation, Redwood Shores, CA (US)

(72) Inventor: Sudhir Arthanat, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 13/962,953

(22) Filed: Aug. 9, 2013

(65) Prior Publication Data

US 2015/0046412 A1    Feb. 12, 2015

(51) Int. Cl.
    G06F 17/30    (2006.01)
(52) U.S. Cl.
    CPC ............................ G06F 17/30557 (2013.01)
(58) Field of Classification Search
    CPC .............. G06F 17/30563; G06F 17/30575; G06F 21/6218; G06F 17/30917; G06F 17/303; Y10S 707/99931
    See application file for complete search history.

(56) References Cited

U.S. PATENT DOCUMENTS

| | | | | |
|---|---|---|---|---|
| 5,159,597 A * | 10/1992 | Monahan | ............ | G06F 11/0751 714/2 |
| 5,204,939 A * | 4/1993 | Yamazaki | ............ | G06F 17/5045 706/47 |
| 6,542,593 B1 * | 4/2003 | Bowman-Amuah | ... | H04L 12/14 370/232 |
| 7,299,216 B1 * | 11/2007 | Liang et al. | | |
| 7,437,478 B2 * | 10/2008 | Yokota | ............ | H04L 67/322 709/238 |
| 7,548,898 B1 * | 6/2009 | Tarenskeen | ............ | G06F 17/303 |
| 8,103,566 B1 * | 1/2012 | Petruzzi | ............ | G06Q 40/00 705/30 |
| 8,248,648 B2 * | 8/2012 | Yamauchi | ............ | H04N 1/00912 358/1.16 |
| 8,397,128 B1 * | 3/2013 | Alonzo et al. | ............ | 714/759 |
| 8,458,148 B2 * | 6/2013 | Tahiliani | ............ | G06F 7/00 707/694 |
| 9,043,453 B1 * | 5/2015 | Kielhofner | ............ | H04L 41/50 709/223 |
| 9,069,665 B2 * | 6/2015 | Murphy | ............ | G06F 11/0709 |
| 2002/0161778 A1 * | 10/2002 | Linstedt | ............ | 707/102 |
| 2002/0198897 A1 * | 12/2002 | Geuss | ............ | G06F 17/30569 |
| 2005/0004831 A1 * | 1/2005 | Najmi | ............ | G06Q 10/06 705/7.22 |
| 2005/0066240 A1 * | 3/2005 | Sykes et al. | ............ | 714/48 |
| 2006/0156190 A1 * | 7/2006 | Finkelstein et al. | ............ | 714/763 |
| 2006/0161806 A1 * | 7/2006 | Gromyko | ............ | 714/6 |
| 2006/0288183 A1 * | 12/2006 | Boaz | ............ | G06F 11/1451 711/164 |
| 2007/0208787 A1 * | 9/2007 | Cheng et al. | ............ | 707/204 |
| 2009/0024551 A1 * | 1/2009 | Agrawal et al. | ............ | 706/47 |
| 2009/0063985 A1 * | 3/2009 | Lin | ............ | 715/733 |
| 2009/0132662 A1 * | 5/2009 | Sheridan | ............ | G06Q 10/107 709/206 |
| 2009/0175285 A1 * | 7/2009 | Wood | ............ | H04L 45/04 370/402 |
| 2010/0275128 A1 * | 10/2010 | Ward | ............ | G06Q 10/06 715/744 |

(Continued)

Primary Examiner — Loan L. T. Truong
(74) Attorney, Agent, or Firm — Iphorizons PLLC; Narendra Reddy Thappeta

(57) ABSTRACT

An aspect of the present disclosure provides for handling of errors in data transferred from a source system to a target system. In an embodiment, the data is first transferred (from a source system) to a staging table as staging data. A user is enabled to configure rules to identify a respective portion of interest in the staging data, an error condition to be checked in the respective portion, and an action to be performed upon detection of the error in the respective portion. Accordingly, the staging data stored in the staging table is examined according to the rules to identify a first error associated with a first portion of the staging data, and an action associated with the combination of first portion and the first error is performed, as specified in the rules.

20 Claims, 9 Drawing Sheets

(56) References Cited

U.S. PATENT DOCUMENTS

| | | | |
|---|---|---|---|
| 2011/0071979 A1* | 3/2011 | Tahiliani | G06F 7/00 707/600 |
| 2012/0041921 A1* | 2/2012 | Canaday | G06F 17/30507 707/607 |
| 2012/0110667 A1* | 5/2012 | Zubrilin | G06F 21/56 726/24 |
| 2012/0151278 A1* | 6/2012 | Tsantilis | G06F 11/366 714/48 |
| 2012/0173562 A1* | 7/2012 | Zhu | G06F 17/3097 707/767 |
| 2012/0198569 A1* | 8/2012 | Halas | 726/30 |
| 2012/0290576 A1* | 11/2012 | Amorim | 707/737 |
| 2013/0055042 A1* | 2/2013 | Al Za'noun | G06Q 10/06395 714/746 |
| 2013/0073515 A1* | 3/2013 | Bhide | G06F 17/30563 707/602 |
| 2014/0081931 A1* | 3/2014 | Kung | G06F 17/30 707/694 |
| 2014/0236880 A1* | 8/2014 | Yan | G06N 5/025 706/47 |
| 2014/0279890 A1* | 9/2014 | Srinivasan et al. | 707/626 |
| 2014/0359627 A1* | 12/2014 | Vermette | G06F 11/1482 718/101 |
| 2015/0006491 A1* | 1/2015 | He | G06F 17/30575 707/694 |
| 2015/0019303 A1* | 1/2015 | Rao | G06Q 10/06395 705/7.41 |

* cited by examiner

| | BO_Unit | Vendor_Id | Transaction Date | Amount | Transferred Y/N | Error Code |
|---|---|---|---|---|---|---|
| 411 → | B1 | V1 | 06/01/2012 | 600 | | |
| 412 → | B1 | " " | 01/01/2012 | 500 | | |
| 413 → | | V2 | 05/01/2012 | 100 | | |
| 414 → | XX | V3 | 01/01/2001 | 200 | | |
| 415 → | XX | " " | 08/01/2012 | 300 | | |

FIG. 4A

| | BO_Unit | Vendor_Id | Transaction Date | Amount | Transferred Y/N | Error Code |
|---|---|---|---|---|---|---|
| | 410 | 420 | 430 | 440 | 450 | 460 |
| 411 → | B1 | V1 | 06/01/2012 | 600 | Y | "" |
| 412 → | B1 | " " | 01/01/2012 | 500 | N | VC01 |
| 413 → | | V2 | 05/01/2012 | 100 | N | BU01 |
| 414 → | XX | V3 | 01/01/2001 | 200 | N | BU01 |
| 415 → | XX | " " | 08/01/2012 | 300 | N | BU01,VC01 |

| | 605 | 610 | 620 | 630 | 640 | 650 | 670 | 680 | 690 |
|---|---|---|---|---|---|---|---|---|---|
| | Application | Table Identifier | Column Identifier | Error condition | Default value Y/N? | Auto-correct Y/N? | Auto-correction script | Manual Correction | Priority |
| 611 → | LEASING | STG_leasing | BO_unit | BO_Unit Is NULL OR BO_Unit="XX" | Y | Y | Update tbl_leasing set bo_unit ="01" | NONE | 01 |
| 612 → | LEASING | STG_leasing | Vendor_id | Vendor_id Is NULL | N | N | NULL | http://www.leasingbusiness.com/leasedata/ | 02 |
| 613 → | ACCOUNTS | STG_expenses | exp_date | exp_date > today | N | N | NULL | http://www.leasingbusiness.com/expense/ | 01 |
| 614 → | ASSETS | STG_assetMgmt | InvoiceDate | InvoiceDate >= StartDateOpenPeriod and InvoiceDate <= EndDateOpenPeriod | N | N | NULL | Send notification to asset manager with link to navigate to specific accounting period | 01 |

*FIG. 6*

HANDLING OF ERRORS IN DATA TRANSFERRED FROM A SOURCE APPLICATION TO A TARGET APPLICATION OF AN ENTERPRISE RESOURCE PLANNING (ERP) SYSTEM

BACKGROUND

1. Technical Field

The present disclosure relates to enterprise resource planning (ERP) systems and more specifically to handling of errors in data transferred from a source application to a target application of an ERP system.

2. Related Art

Enterprise resource planning (ERP) systems are normally used to integrate the management of information across different constituent applications, which are designed for specific business functionality. For example, an ERP system may contain individual/constituent applications for functions such as finance/accounting, time and labor, sales and service, customer relationship management, human resources, etc., with data easily shared between each of these applications for proper planning across potentially the entire organization.

Data is accordingly transferred from one application (source application) to another application (target application) in an ERP system. For example, a finance/accounting application may receive data from time and labor application (for hours spent by various individuals) and human resources application (for the hourly rates of the individuals) to generate and send an invoice to a customer (to whom a service has been delivered).

There are often errors in data transferred from a source application to a target application. These errors can be due to reasons such as unavailability of the corresponding data portion, format incompatibility with the requirements of the target system, etc.

Such errors can cause various inefficiencies (e.g., unneeded delays) in relation to the target application and it is thus generally desirable to effectively handle the errors prior to being processed at the target applications.

BRIEF DESCRIPTION OF THE DRAWINGS

Example embodiments of the present disclosure will be described with reference to the accompanying drawings briefly described below.

FIG. 3 depicts a portion of a configuration data used by a query builder for generating SQL queries in one embodiment.

FIG. 4A depicts staging data at a time instance in an embodiment.

FIG. 4B depicts the staging data illustrating the manner in which errors are handled in an embodiment.

FIG. 6 depicts the manner in which configuration rules are stored in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present disclosure provides for handling of errors in data transferred from a source system to a target system. In an embodiment, the data is first transferred (from a source system) to a staging table as staging data. A user is enabled to configure rules to identify a respective portion of interest in the staging data, an error condition to be checked in the respective portion, and an action to be performed upon detection of the error in the respective portion. Accordingly, the staging data stored in the staging table is examined according to the rules to identify a first error associated with a first portion of the staging data, and an action associated with the combination of first portion and the first error is performed, as specified in the rules.

Due to such user specified rules, error conditions observed post-deployment of source applications, can also be easily addressed. In an embodiment, the source systems and the target systems implement respective constituent applications of an ERP system, and the data may be shared between the constituent applications with reduced errors due to the features of the present disclosure.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
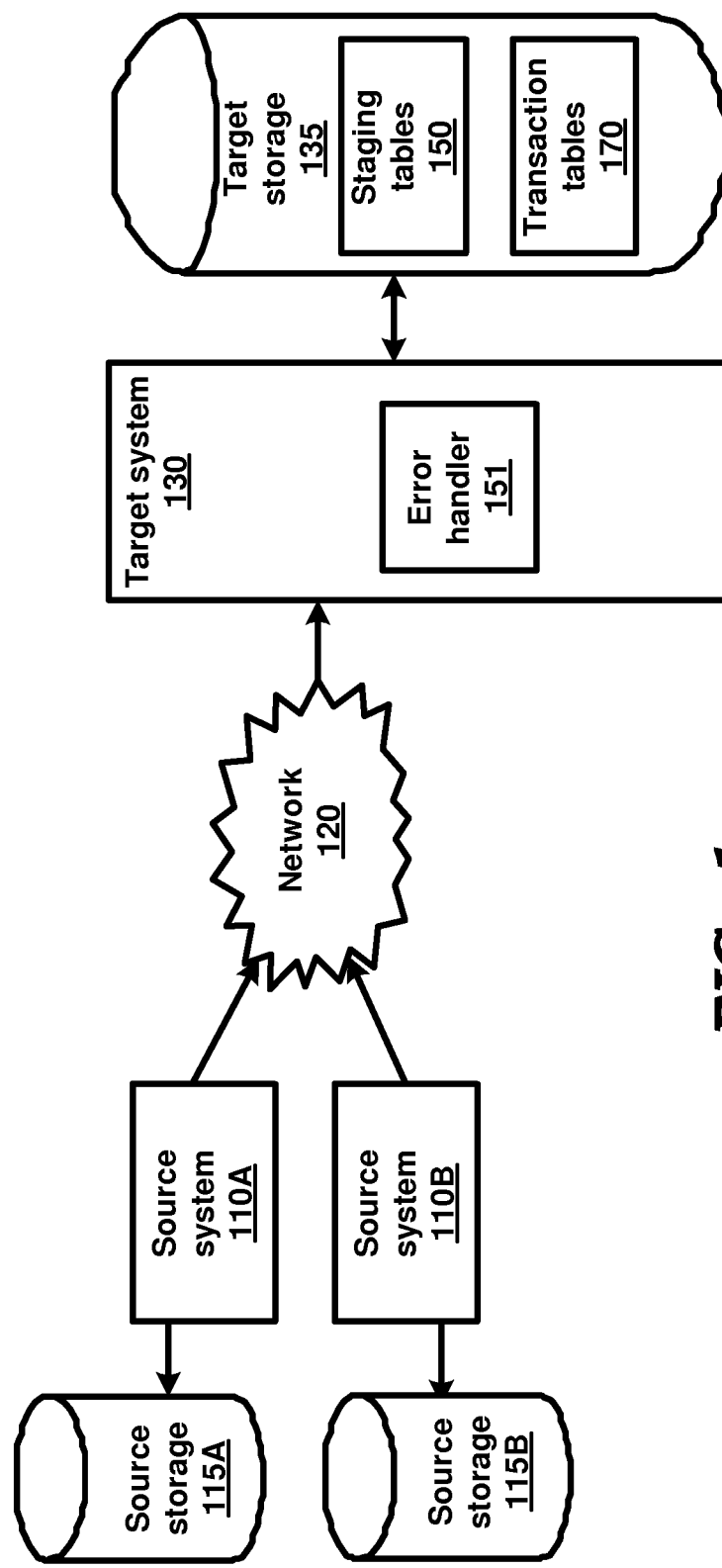
FIG. 1 is a block diagram illustrating an example environment in which several aspects of the present disclosure can be implemented.

FIG. 1 is a block diagram illustrating an example environment in which several aspects of the present disclosure can be implemented. The environment is shown containing source systems 110A-110B, source storages 115A-115B, network 120, target system 130, and target storage 135. Target system 130 is shown containing error handler 151 while target storage 135 is in turn shown containing staging tables 150 and transaction tables 170.

Merely for illustration, only representative number/type of systems/data centers is shown in the Figure. Many environments often contain many more data centers, each in turn containing many more systems, both in number and type, and located geographically separately (but connected with each other via corresponding network paths depending on the purpose for which the environment is designed. Each system/device of FIG. 1 is described below in further detail.

Network 120 provides connectivity between source systems 110A-110B and target system 130. Network 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet is said to be directed to a destination/target system when the destination IP address of the packet is set to the (IP) address of the destination system, such that the packet is eventually delivered to the destination system by network 120. When the packet contains content such as port numbers, which specifies the destination application, the packet may be said to be directed to such application as well. The destination system may be required to keep the corresponding port numbers available/open, and process the packets with the corresponding destination ports. Network 120 may be implemented using any combination of wire-based or wireless mediums.

Each of data storages source data storages 115A-115B and target storage 135 represents a corresponding non-volatile storage facilitating storage and retrieval of a corresponding collection of data. Each of the data stores may be implemented using relational database technologies and therefore provide storage and retrieval of data using structured queries such as SQL (Structured Query Language). Alternatively, some of the data stores may be implemented as file stores providing storage and retrieval of data in the form of one or more files organized as one or more directories, as is well known in the relevant arts. The data storages may be implemented using network accessible database technologies as well.

Each of source systems 110A-110B and target system 130 executes a corresponding constituent application of an ERP system. For example, source system 110A may implement time and labor application, source system 110B may implement a human resources application, and target system 130 may implement finance/accounting application. Each system 110A-110B/130 may store/retrieve data to/from corresponding data store 115A-115B/135 during execution of the corresponding application. Thus, it is assumed that the data available in each of source systems 110A-110B (and other systems, not shown) is required for processing some of the transactions in target system 130.

Target system 130 is shown containing error handler 151, and target storage 135 is shown containing staging tables 150 and transaction tables 170. In general, staging tables 150 receive and store data incrementally from various sources and transfers the data eventually to transaction tables 170. Each staging table may receive data for some columns from one source and others from other sources. Such consolidated data may be eventually transferred to transaction tables 170 of target storage 135. Applications (e.g., ERP applications noted above) may execute from data based on target storage 135. Though shown based on same storage 135, staging tables 150 and transaction tables 170 may be implemented in separate storages, with corresponding associated software as well.

As noted in the Background section, errors in data received at target applications can be source of various inefficiencies. Often vendors of the enterprise application ship various validation tools along with the constituent applications. However, such tools may not anticipate many of the errors that may eventually be observed in the post-deployment scenarios (i.e., after the constituent applications are shipped and deployed on the corresponding systems) in the data transferred from a source system to a target system.

Error handler 151 provided according to an aspect of the present disclosure facilitates handling of such errors also, as described below with examples.

3. Error Handling

Figure 2:
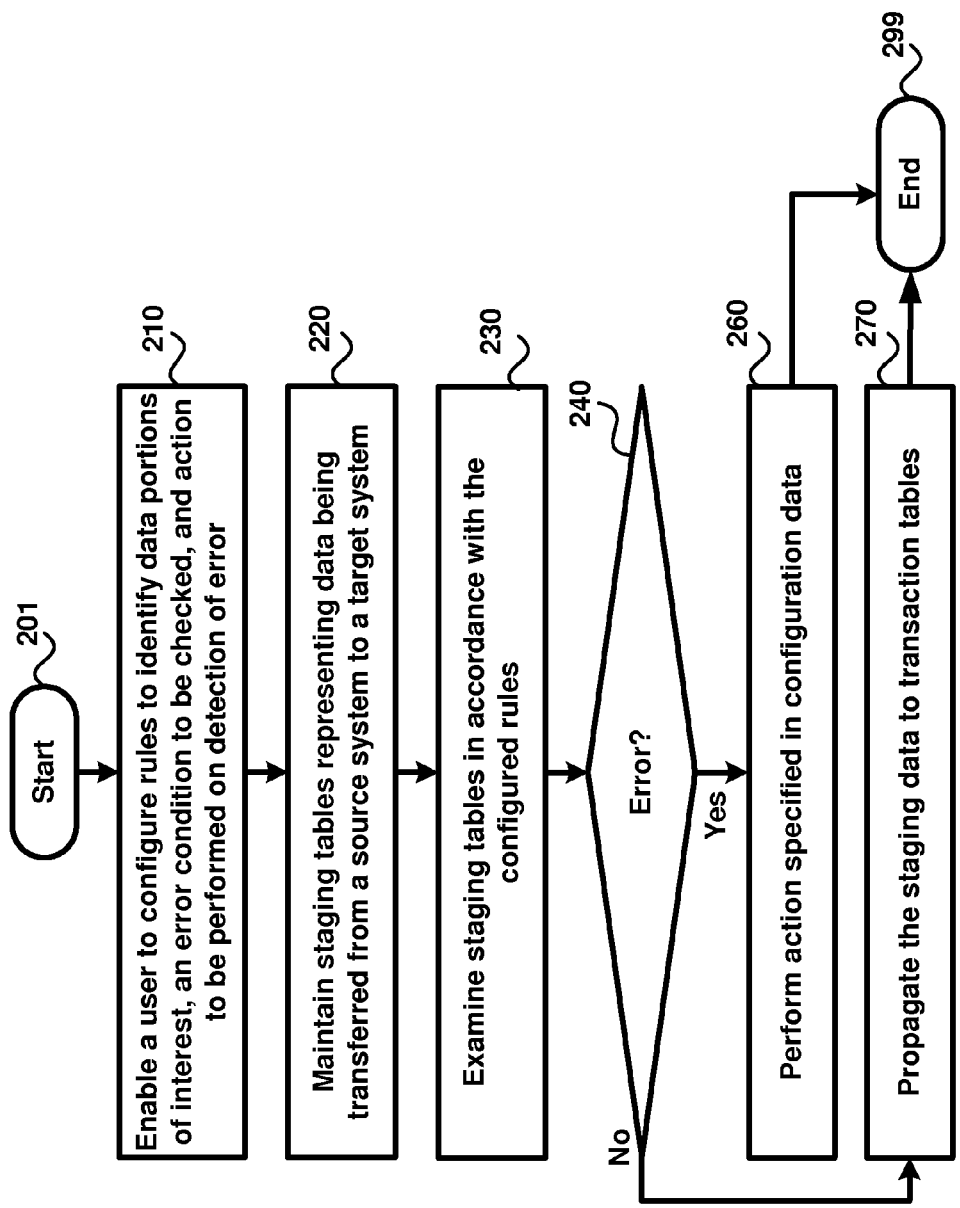
FIG. 2 is a flow chart illustrating the manner in which errors are handled according to an aspect of the present disclosure.

FIG. 2 is a flow chart illustrating the manner in which errors are handled according to an aspect of the present disclosure. The flowchart is described with respect to the systems of FIG. 1 merely for illustration. However, the features can be implemented in other environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, error handler 151 enables a user to configure rules to identify data portions of interest within staging tables 150, an error condition to be checked in the rows, and action to be performed on detection of error. Any suitable user interface may be provided, though an example user interface is described in sections below for illustration. In general, each rule may be crafted taking into account the specific errors encountered during processing (either transactions or reception of the data) of the data in target system 130.

In step 220, staging tables 150 store data (staging data) being transferred from various source systems for processing in target system 130, for example, by operation of applications executing in target system 130. Data from multiple source systems may be received and stored, as suitable in the corresponding environments. In an embodiment, staging tables 150 store data (staging data) according to the requirements (e.g., consolidating data required by target system 130 from source systems 110A and 110B) of transaction tables 170 in target storage 135.

In step 230, error handler 151 examines the data in staging tables 150 in accordance with the configured rules. The data may be examined periodically (e.g., every few minutes/hours or when there are updates to the data stored in staging tables 150). Thus, specific rows of data may be retrieved and examined, and errors (if any) identified in the retrieved rows, in accordance with the configured rules. In step 240, control passes to step 260 if errors are found, and to step 270 otherwise.

In step 260, error handler 151 performs the action, applicable to the examined data and error combination, as specified in the configuration data. The action is designed to address the error in the data. Some of the actions may be automatic, while others may require human intervention, as described below with examples. In some of the cases, appropriate communication is established with the source system from which the erroneous portion is expected to be received, such that the error may be corrected at the source system and the corrected data resent. The action is performed with respect to errors in each of the data portions of the staging data. Control then transfers to step 299.

In step 270, target system 130 propagates the staging data, found to be without errors, to transaction tables 170. Thus, each portion of the staging without errors, may be propagated to transaction tables 170. The flow chart ends in step 299. The flow chart may be executed periodically to propagate the accumulated staging data to transaction tables.

It may thus be appreciated that a user may specify any custom rules, based on experience during operation of the ERP system (i.e., post deployment of the constituent applications). Errors may accordingly be identified (and corrected) in staging tables 150, before the data is transmitted to target system 130, and the various inefficiencies of concern are accordingly avoided. The description is continued with respect to the details of staging system, including operation of error handler 151, in various example scenarios.

4. Staging System

Figure 3:
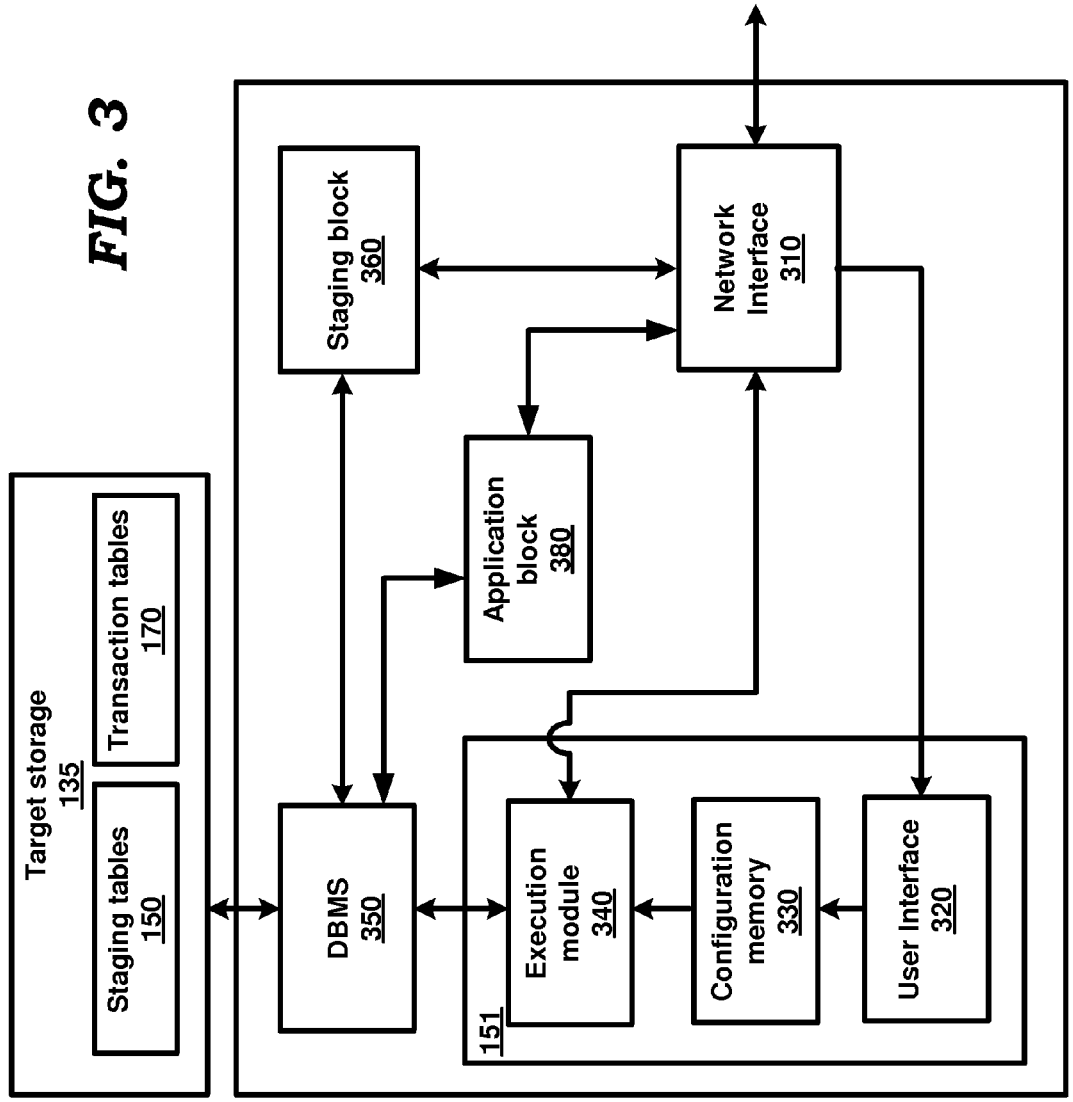
FIG. 3 is a block diagram illustrating the details of a target system in an embodiment.

FIG. 3 is a block diagram illustrating the details of target system 130 in an embodiment. Target system 130 is shown containing network interface 310, user interface 320, configuration memory 330, execution module 340, database management system (DBMS) 350, staging block 360 and application block 380. As will be clear from the description below, user interface 320, configuration memory 330 and execution module 340 together represent an example implementation of error handler 151. Each block is described below in further detail.

DBMS 350 allows the definition, creation, querying, update, and administration of data stored in staging tables 150 and transaction tables 170. The data may be organized in the form of relational database and DBMS 350 may accordingly be implemented based on various SQL products available in the industry. Application block 380 represents the constituent ERP application which operates based on the data in transaction tables 170. Application block 380 may retrieve/store data of interest by interfacing with DBMS 350 in a known way.

Configuration memory 330 represents a memory for storing the rules configured by a user. The memory may correspond to a non-volatile memory, though the rules are retrieved into a volatile memory during operation. As noted above, the rules may specify the specific data (rows) of interest in staging tables 150 to be examined, the error condition to be checked in the rows, and the action to be taken upon detection of the error condition.

Staging block 360 operates in conjunction with various data sources, including source systems 110A/110B, to store (as staging data) data in transit to an application executing on target system 130. Staging block 360 similarly operates to propagate the staging data to transaction tables 170 at appropriate time durations. As noted above, staging block 360 may consolidate data from multiple sources, in tables according to a schema suited for the requirements of target system 130. Staging block 360 may interface with DBMS 350 in the form of SQL queries, for storing and retrieval of data.

Execution module 340, upon execution, implements the various rules in configuration memory 330. In an embodiment, each rule contains a script, and accordingly execution module 340 executes such scripts to implement the rules. Execution module 340 interfaces with DBMS 350 to retrieve the rows of interest specified by each rule, prior to examination of the retrieved rows in accordance with the rules. Though not shown, execution module 340 may interface with any external systems (e.g., mail server, not shown, or source system from which the erroneous portion is received) to perform the action associated with each rule, when an error condition specified by the rule is detected.

User interface 320 enables a user to configure various rules, and the configured rules are stored in configuration memory 330. User interface 320 may simplify configuration of rules, as described below with examples.

5. Illustrative Example

FIGS. 4A through 6 together illustrate the manner in which errors in data transferred from a source application to a target application are handled in one embodiment. In particular, FIG. 4B depicts staging data at a time instance, FIGS. 5A and 5B depict a graphical user interface (GUI) provided by a target system 130 to enable a user to specify configuration rules, FIG. 6 depicts the manner in which configuration rules are stored, and FIG. 4B the information associated with staging data after processing according to the configuration rules, in one embodiment. Each of the Figures is described in detail below.

FIG. 4A depicts the content of a table (400) representing staging tables 150. However, the staging data may be stored in multiple tables, or maintained using other data formats such as extensible markup language (XML), as will be apparent to one skilled in the relevant arts by reading the disclosure herein.

Table 400 (identified as STG_leasing) depicts portions of data representing leasing information received from source systems 110A-110B and is shown containing columns "BO_unit" 410, "Vendor_Id" 420, "Transaction_Date" 430, "Amount" 440 specifying corresponding data attributes required for processing leasing data at target system 130.

Table 400 is shown further containing column "Transferred Y/N" 450 to indicate status of transfer of a data row to transaction table 170. A value of "Y" in "Transferred Y/N" indicates that a data row is transferred (or propagated) to target system 130 and a value "N" represents that the row has not been transferred to target system 130, for example, due to an error condition sought to be resolved.

Column "Error Code" 460 indicates corresponding error condition in a data row. Error handler 151 examines data rows in table 400 according to applicable configured rules to determine any error condition, and any detected error is stored in column 460. The value in error code 460 may determine the corrective action.

Each of rows 411-415 specifies data values constituting leasing information. The values in columns 450/460 are shown as blank to indicate the values are undefined. Execution module 340 sets the values in columns 450/460 based on rules stored in configuration memory 330. The description is continued with respect to the manner in which a user may be enabled to specify such rules.

5. Graphical User Interface

Figure 5A:
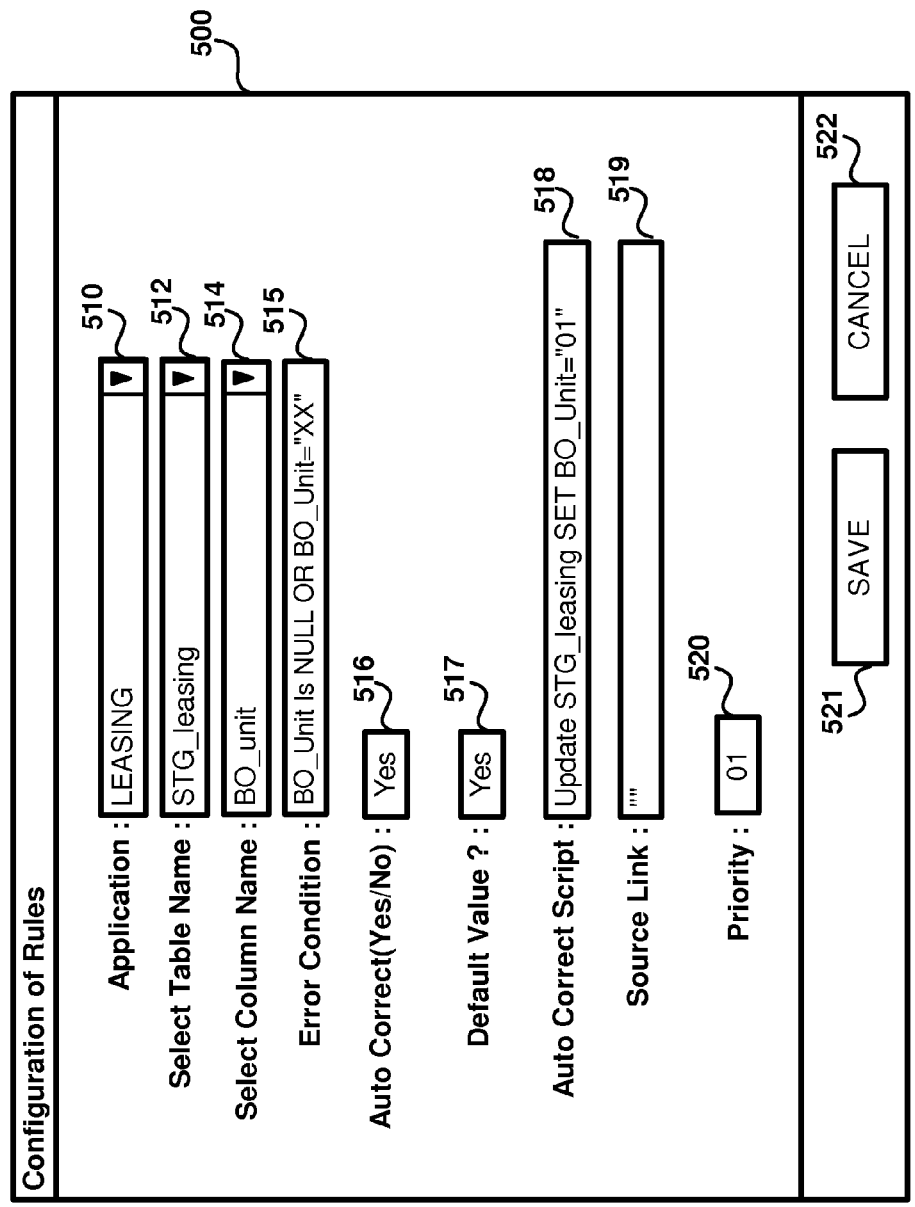
FIGS. 5A and 5B depict a graphical user interface (GUI) provided by a target system to enable users to specify configuration rules.

FIG. 5A depicts graphical user interface (GUI) provided by user interface 320 in one embodiment. Display area 500 depicts a portion of a user interface provided on a display unit (not shown in FIG. 1) associated with one of end user systems to enable configuration of rules. The user interface may be controlled (or be defined) from target system 130, as described above.

According to an example convention, each rule is specified to contain a table identifier, column identifier, error condition to be checked for the data item (value) at the intersection of the indicated column and row(s), and an indication on how the error is to be corrected. In an embodiment, the error may be corrected automatically or manually. Further, the user is enabled to specify a default value that can be used in case of automatic correction of the error.

Drop-down menu 510 indicates a target application executing on target system 130, processing staging data according to the rule being configured. Accordingly, drop down 510 facilitates the option of selecting from a list of available applications. The user is shown to have selected "LEASING" application.

The user is similarly shown as having selected a desired table, and a column within that table using drop-down menus 512 and 514. It may be appreciated that user interface 320 can communicate with DBMS 350 to dynamically retrieve, for the specified application (510) the identifiers of tables and corresponding columns, and populate the respective drop down menus 512/514. Thus, once a user selects a specific table of interest, the column identifiers of the selected table may be retrieved dynamically via DBMS 350.

Display portion 515 enables a user to specify error condition to check for the column identified by the column identifier against each row. The user is shown to have specified an error condition "BO_unit is NULL OR BO_unit="XX"" (for example, based on prior experience with observation of data such as row 413).

Display portion 516, 517 and 518 in combination determines whether error condition (specified in 515), when found to exist in a data row, is to be corrected automatically. For example, corresponding values "Yes", "Yes" and "UPDATE STG_leasing SET BO_unit="01"" specified in display portions 516, 517 and 518 indicates that the error condition "BO_unit is NULL OR BO_Unit="XX" when found to exist in a data row, is corrected by execution module 340 automatically executing the script "UPDATE STG_leasing SET BO_unit="01"".

Display portion 519 is operative only when auto-correct field 516 is set to a value of no (as described below with respect to FIG. 5B).

Display portion 520 enables a user to specify in a rule, an associated priority for correcting an error condition. The priority value may be used to force correction of certain types of errors, before other types of errors. For example, all errors with a priority of 1 may be corrected before errors with priority 2. In FIG. 5A, the user is shown to have indicated a value of "1" associated with the error condition-"BO_unit is NULL OR BO_unit="XX""

Selection of control "SAVE" (521) enables storing of the specified rule in configuration memory 330. Selection of Cancel (522) does not store the rule.

Figure 5B:
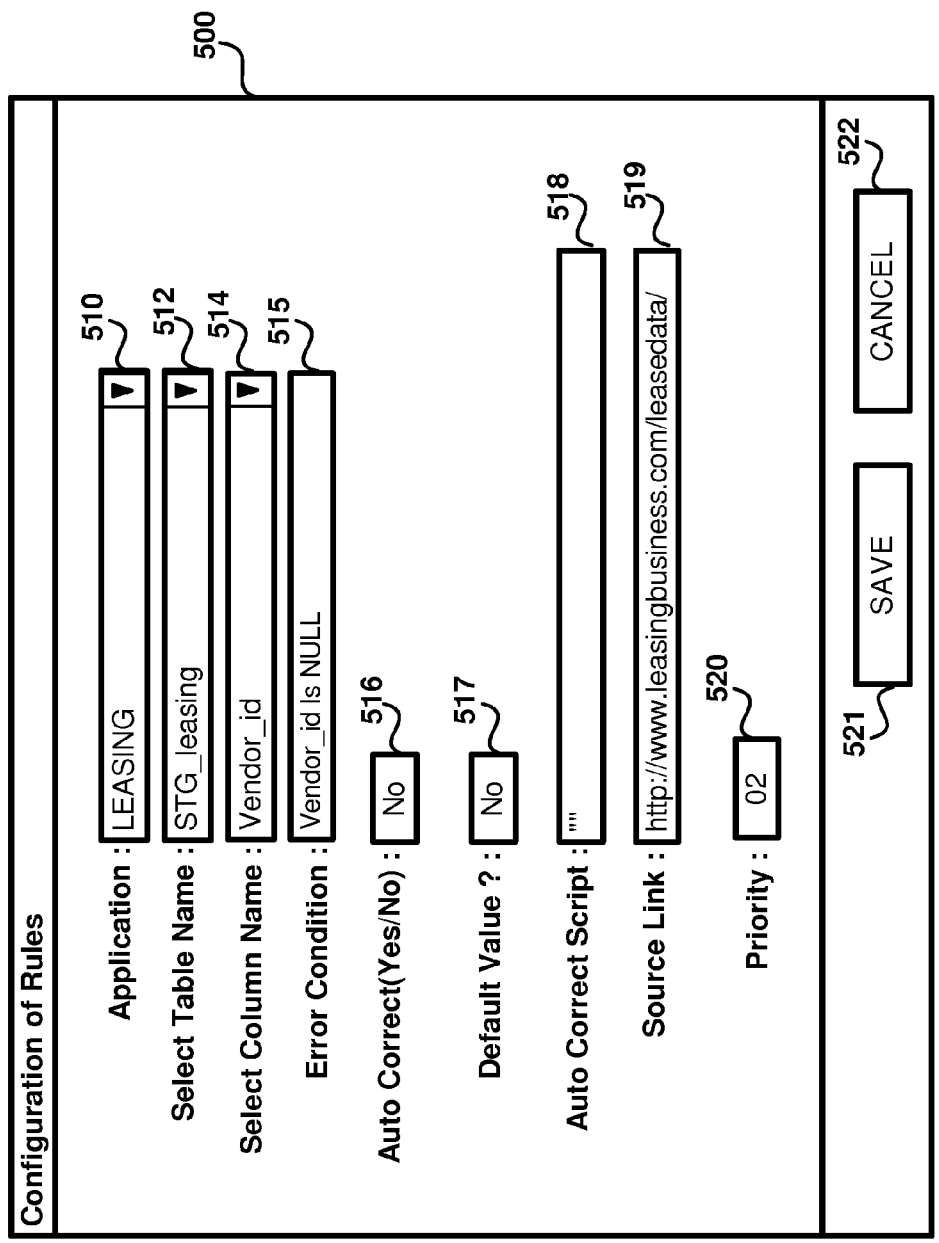

FIG. 5B depicts display area 500 with end user specifying corresponding values to configure another rule associated with table "STG_leasing" for column identified by column identifier "Vendor_id" (514) (of application "LEASING" specified in dropdown menu 510). In contrast to FIG. 5A, the user is shown to have specified "No" for automatic correction (in portion 516), and a NULL (" ") value auto-correct script 518 (since it is operative only in case of auto-corrections).

Display portion 519 specifies a link at which a user can manually correct the error. Thus, to facilitate correction, execution module 340 may be designed to notify (e.g., email) the link to the user. The user may accordingly access a web page at the link, and manually specify a desired value (to replace the error value) using an appropriate interface provided at the web page.

The description is continued with an illustration of a manner in which the configured rules may be stored in an embodiment.

6. Configured Rules

FIG. 6 depicts table 600 containing the configured rules in an embodiment. Table 600 may be stored in a non-volatile memory provided in target system 130 or target storage 135. It may be appreciated configured rules may be stored in other data formats such as extensible markup language (XML) as well, as will be apparent to one skilled in the relevant arts by reading the disclosure herein.

Consistent with the interface of FIGS. 5A and 5B, table 600 is shown containing columns application 605, table identifier 610, column identifier 620, error condition 630 to store corresponding values that have been specified by the user in display items 510, 512, 514 and 515 respectively. Similarly, column "Default Value Y/N?" 640, "Auto-correct Y/N?" 650, Auto-correction script 670, Manual correction 680, and Priority 690 depicts portions of configuration rules to store corresponding values specified by the user in display portions 517, 516, 518 and 519 respectively.

Data rows 611 and 612 are shown containing configuration rules configured in FIGS. 5A and 5B respectively. Similarly other rows 613-614 specify corresponding rules specified for columns "Exp_date" and "InvoiceDate" in corresponding tables "STG_expenses" and "STG_assetmgmt" (not shown) of corresponding application.

As noted above, execution module 340 executes the rules of FIG. 6 periodically, to examine the data rows in staging tables 150 for errors in the rows, and further performs the specified corrective action (also specified in the rule) upon detection of presence of the error condition.

Thus, processing of the rule of row 611 causes the value corresponding to BO-Unit 410 of row 413 to be set to the default value of 1, and processing of the rule of row 612 causes the user to be navigated to a web page at link/UL in column 680 to facilitate the user to manually correct the vendor-id 420 of the corresponding row. The rules of rows 611, 613 and 614 may be processed first, ahead of the rule of row 612 in view of the values in priority 690.

FIG. 4B depicts the status of staging table upon processing of the staging data of FIG. 4A in accordance with the rules of FIG. 6. Row 411 specifies that the data values do not have any error condition (with a value " " under column "Error Code" 460) and has been transferred for processing at target system 130 (with a value of "Y" under column "Transferred Y/N" 450).

Row 412 specifies that there is an error condition associated with the data values as indicated by the value "VC01" under column 460 "Error Code". Similarly other rows 413-415 specify the transfer status and error condition for data values in corresponding rows. As may be observed, the rows with error conditions are not transferred, though the value in column 450 can be no, when the corresponding data portion is awaiting transfer to target system 130.

It may be appreciated from the above description that errors in data transferred from a source system can be identified and corrected based on user configured rules. As a result various inefficiencies can be avoided at the target systems.

It should be further appreciated that the features described above can be implemented in various embodiments as a desired combination of one or more of hardware, software, and firmware. The description is continued with respect to an embodiment in which various features are operative when the software instructions described above are executed.

8. Digital Processing System

Figure 7:
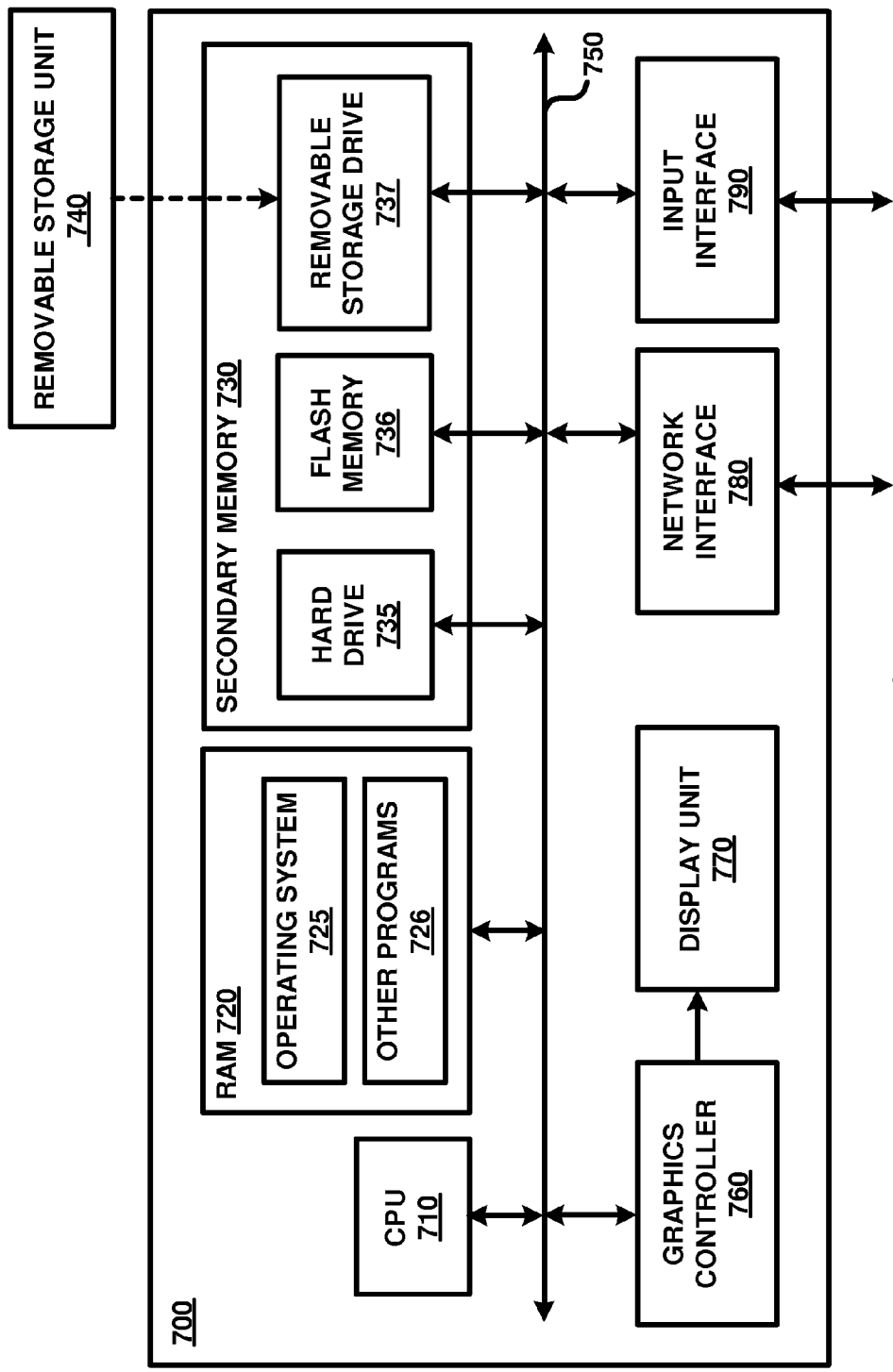
FIG. 7 is a block diagram illustrating the details of a digital processing system in which various aspects of the present disclosure are operative by execution of appropriate software instructions.

FIG. 7 is a block diagram illustrating the details of digital processing system 700 in which various aspects of the present disclosure are operative by execution of appropriate software instructions. Digital processing system 700 may correspond to target system 130. Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting operating system 725 and/or other code/programs 726 (e.g., those shown in FIG. 3). In addition to operating system 725, RAM 720 may contain other software programs such as device drivers, virtual machines, etc., which provide a (common) run time environment for execution of other code/programs 726.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems (such as those shown in FIG. 1) connected to the network.

Secondary memory 730 may contain hard drive 735, flash memory 736, and removable storage drive 737. Secondary memory 730 may store the data (e.g., configured rules) and software instructions (e.g. for performing the actions of FIG. 2), which enable digital processing system 700 to provide several features in accordance with the present disclosure.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 738.

Removable storage unit 740 may be implemented using medium and storage format compatible with removable storage drive 737 such that removable storage drive 738 can read the data and instructions. Thus, removable storage unit 740 includes a computer readable (non-transitory storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of handling errors in data transferred from a source system to a target system, said method comprising:

maintaining in staging tables as staging data, the data being transferred from said source system to an application of said target system, wherein said staging tables are maintained as database tables accessible via a database management system (DBMS) such that said staging data is stored in said database tables;

receiving rules from a user, each rule identifying a respective portion of interest in said staging data, an error condition to be checked in the respective portion and an action to be performed upon detection of an error in the respective portion based on said error condition, wherein said respective portion of interest is specified in the form of a table identifier and a column identifier, said table identifier uniquely identifying a corresponding table of said database tables, said column identifier uniquely identifying a corresponding column in the corresponding table identified by said table identifier, wherein said error condition represents the condition to be checked against each row in said corresponding column identified by said column identifier, wherein said action comprises an expression specifying a default value representing the value an entry at the intersection of said column and the row having the error, is to be set to;

examining said staging data stored in said staging tables according to a first rule of said rules to identify a first error associated with a first data item in a first portion of said staging data; and performing, upon identifying said first error, an action associated with said combination of said first portion and said first error, as specified by said first rule in said rules, wherein said action updates said first data item to a new value, said new value corresponding to the default value specified by said first rule of said rules, wherein said examining and said performing of said action are performed on said staging data stored in said database tables.

2. The method of claim 1, further comprising propagating said respective portion of interest to a transaction table if no error is detected by said examining.

3. The method of claim 1,
wherein each received rule also specifies an indication of whether an error value is to be corrected automatically or manually,
said rule also specifying said expression in case said indication indicates that said error value is to be corrected automatically.

4. The method of claim 3, wherein said first rule further specifies a link which can be actuated to view and modify said error value, said method further comprising notifying said link to said user if said indication specified by said first rule indicates that said error value is to be corrected manually.

5. The method of claim 4, wherein said link is notified in the form of an email communication.

6. The method of claim 3, wherein said source system and said target system execute a respective constituent application of a plurality of constituent applications of an enterprise resource planning (ERP) system,
wherein data generated by the constituent application executing in said source system is transferred to the constituent application executing in said target system.

7. The method of claim 1, wherein said rules comprise a first set of rules and a second set of rules, each of said first set of rules having a first value for a priority and each of said second set of rules having a second value for said priority, wherein said first value specifies a higher priority relative to said second value,
said method further comprising processing all of said first set of rules prior to processing any of said second set of rules in view of said first value specifying said higher priority,
wherein said processing comprises said examining and said performing for each rule of said first set of rules and said second set of rules.

8. A non-transitory machine readable medium storing one or more sequences of instructions for causing a digital processing system to handle errors in data transferred from a source system to a target system, wherein execution of said one or more sequences of instructions by one or more processors contained in said digital processing system causes said digital processing system to perform a set of actions comprising:
maintaining in staging tables as staging data, the data being transferred from said source system to an application of said target system, wherein said staging tables are maintained as database tables accessible via a database management system (DBMS) such that said staging data is stored in said database tables;

receiving rules from a user, each rule identifying a respective portion of interest in said staging data, an error condition to be checked in the respective portion and an action to be performed upon detection of an error in the respective portion based on said error condition, wherein said respective portion of interest is specified in the form of a table identifier and a column identifier, said table identifier uniquely identifying a corresponding table of said database tables, said column identifier uniquely identifying a corresponding column in the corresponding table identified by said table identifier, wherein said error condition represents the condition to be checked against each row in said corresponding column identified by said column identifier, wherein said action comprises an expression specifying a default value representing the value an entry at the intersection of said column and the row having the error, is to be set to;

examining said staging data stored in said staging tables according to a first rule of said rules to identify a first error associated with a first data item in a first portion of said staging data; and performing, upon identifying said first error, an action associated with said combination of said first portion and said first error, as specified by said first rule in said rules, wherein said action updates said first data item to a new value, said new value corresponding to the default value specified by said first rule of said rules, wherein said examining and said performing of said action are performed on said staging data stored in said database tables.

9. The non-transitory machine readable medium of claim 8, said set of actions further comprising propagating said respective portion of interest to a transaction table if no error is detected by said examining.

10. The non-transitory machine readable medium of claim 8,
wherein each received rule also specifies an indication of whether an error value is to be corrected automatically or manually,
said rule also specifying said expression in case said indication indicates that said error value is to be corrected automatically.

11. The non-transitory machine readable medium of claim 10, wherein said first rule further specifies a link which can be actuated to view and modify said error value, said set of actions further comprising notifying said link to said user if said indication specified by said first rule indicates that said error value is to be corrected manually.

12. The non-transitory machine readable medium of claim 11, wherein said link is notified in the form of an email communication.

13. The non-transitory machine readable medium of claim 10, wherein said source system and said target system execute a respective constituent application of a plurality of constituent applications of an enterprise resource planning (ERP) system,
wherein data generated by the constituent application executing in said source system is transferred to the constituent application executing in said target system.

14. The non-transitory machine readable medium of claim 8, wherein said rules comprise a first set of rules and a second set of rules, each of said first set of rules having a first value for a priority and each of said second set of rules having a second value for said priority, wherein said first value specifies a higher priority relative to said second value, said set of actions further comprising processing all of said first set of rules prior to processing any of said second set of rules in view of said first value specifying said higher priority, wherein said processing comprises said examining and said performing for each rule of said first set of rules and said second set of rules.

15. A digital processing system for handling errors in data transferred from a source system to transaction tables, wherein a target application is designed to process said data in said transaction tables, said digital processing system comprising:

a memory to store instructions;

a processor to retrieve and execute said instructions, wherein execution of said instructions causes performance of a set of actions comprising:

maintaining in staging tables as staging data, the data being transferred from said source system to said transaction tables, wherein said staging tables are maintained as database tables accessible via a database management system (DBMS) such that said staging data is stored in said database tables;

receiving rules from a user, each rule identifying a respective portion of interest in said staging data, an error condition to be checked in the respective portion and an action to be performed upon detection of an error in the respective portion based on said error condition, wherein said respective portion of interest is specified in the form of a table identifier and a column identifier, said table identifier uniquely identifying a corresponding table of said database tables, said column identifier uniquely identifying a corresponding column in the corresponding table identified by said table identifier, wherein said error condition represents the condition to be checked against each row in said corresponding column identified by said column identifier, wherein said action comprises an expression specifying a default value representing the value an entry at the intersection of said column and the row having the error, is to be set to;

examining said staging data stored in said staging tables according to a first rule of said rules to identify a first error associated with a first data item in a first portion of said staging data; and performing, upon identifying said first error, an action associated with said combination of said first portion and said first error, as specified by said first rule in said rules, wherein said action updates said first data item to a new value, said new value corresponding to the default value specified by said first rule of said rules, wherein said examining and said performing of said action are performed on said staging data stored in said database tables.

16. The digital processing system of claim 15, wherein said set of actions further comprises propagating said respective portion of interest to said transaction tables if no error is detected by said examining.

17. The digital processing system of claim 15, wherein each received rule also specifies an indication of whether an error value is to be corrected automatically or manually, said rule also specifying said expression in case said indication indicates that said error value is to be corrected automatically.

18. The digital processing system of claim 17, wherein said first rule further specifies a link which can be actuated to view and modify said error value, said set of actions further comprising notifying said link to said user in the form of an email communication if said indication specified by said first rule indicates that said error value is to be corrected manually.

19. The digital processing system of claim 17, wherein said source system and said target system execute a respective constituent application of a plurality of constituent applications of an enterprise resource planning (ERP) system, wherein data generated by the constituent application executing in said source system is transferred to the constituent application executing in said target system.

20. The digital processing system of claim 15, wherein said rules comprise a first set of rules and a second set of rules, each of said first set of rules having a first value for a priority and each of said second set of rules having a second value for said priority, wherein said first value specifies a higher priority relative to said second value, said set of actions further comprising processing all of said first set of rules prior to processing any of said second set of rules in view of said first value specifying said higher priority, wherein said processing comprises said examining and said performing for each rule of said first set of rules and said second set of rules.

* * * * *

UNITED STATES PATENT AND TRADEMARK OFFICE
CERTIFICATE OF CORRECTION

PATENT NO. : 9,477,728 B2
APPLICATION NO. : 13/962953
DATED : October 25, 2016
INVENTOR(S) : Arthanat Page 1 of 1

It is certified that error appears in the above-identified patent and that said Letters Patent is hereby corrected as shown below:

In the Specification

In Column 7, Line 40, after ""XX""" insert -- . --.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*